United States Patent [19]

Duurland et al.

[11] Patent Number: 4,681,280
[45] Date of Patent: Jul. 21, 1987

[54] MAGNETIC-TAPE CASSETTE WITH STRETCHED LINER ARRANGEMENT

[75] Inventors: Jozef M. Duurland, Leusden; Sinnighe J. Bos, Glanerbrug; Hendrik K. Kreeft, Dinxperlo, all of Netherlands

[73] Assignee: Polygram International Holding B.V., Baarn, Netherlands

[21] Appl. No.: 844,053

[22] Filed: Mar. 26, 1986

[30] Foreign Application Priority Data

Mar. 27, 1985 [NL] Netherlands ............... 8500888

[51] Int. Cl.4 .................................. G11B 23/087
[52] U.S. Cl. .................................. 242/199; 242/683; 242/200
[58] Field of Search .................. 242/197–200, 242/68.1, 68.3, 68.5; 360/90, 92, 93, 132, 134

[56] References Cited

U.S. PATENT DOCUMENTS

| | | | |
|---|---|---|---|
| 3,666,193 | 5/1972 | Wellington et al. | 242/199 X |
| 3,756,521 | 9/1973 | Werner | 242/200 |
| 3,797,036 | 3/1974 | Eibensteiner | 242/199 X |
| 3,857,531 | 12/1974 | Jantzen | 242/197 |
| 3,923,272 | 12/1975 | Pertzsch et al. | 242/199 |
| 3,934,839 | 1/1976 | Serizawa | 242/198 |
| 4,126,283 | 11/1978 | Kawachi | 242/199 |
| 4,191,984 | 3/1980 | Tsukidate et al. | 360/132 |
| 4,436,256 | 3/1984 | Saitou | 242/200 |
| 4,469,293 | 9/1984 | Miyazi et al. | 242/200 |
| 4,607,306 | 8/1986 | Shirako | 242/199 X |

FOREIGN PATENT DOCUMENTS 1791011 8/1968 Fed. Rep. of Germany .
2121375 11/1972 Fed. Rep. of Germany .

Primary Examiner—Stuart S. Levy
Assistant Examiner—David Werner
Attorney, Agent, or Firm—David R. Treacy

[57] ABSTRACT

Within the housing of a magnetic tape cassette, two liner foils bear against turns of magnetic tape on each of two reel hubs. Each reel hub has an inner ring and an outer ring, the inner ring being longer axially than the outer ring, and arranged so that each liner foil bears elastically against the respective axial ends of the inner and outer rings of each reel hub adjacent that foil. Each cassette main wall has two drive openings aligned with the respective reel hubs. Each opening has a centering rim for the reel hub, and a concentric flat supporting rim having an inner diameter larger than the outer diameter of the reel hub, for supporting the liner foil adjacent that cassette main wall. The distance between opposed supporting rings is greater than the sum of the width of the magnetic tape and the thicknesses of the two foils.

8 Claims, 3 Drawing Figures

MAGNETIC-TAPE CASSETTE WITH STRETCHED LINER ARRANGEMENT

BACKGROUND OF THE INVENTION

The invention relates to a magnetic-tape cassette comprising a housing which comprises two rectangular parallel main walls, between which two reel hubs on which a magnetic tape is wound are arranged so as to be rotatable about axes of rotation which extend substantially perpendicularly to the main walls. Each main wall has openings which are substantially coaxial with the reel hubs and which are bounded by cylindrical centering rims which extend inwardly relative to the main walls and which center the reel hubs inside the housing relative to the openings. A liner foil is positioned against the inner side of each main wall and bears elastically against the turns of magnetic tape and against the axial end of the reel hub.

A magnetic-tape cassette of this type is disclosed in German Offenlegungsschrift No. 2,121,375. Inside the housing of such a cassette the axial ends of the reel hubs are positioned against liner foils which have upwardly inclined supporting edges and bear elastically against the main walls near their two longitudinal sides. During winding and unwinding of the magnetic tape such foils bear against the rolls of tape on the reel hubs in order to preclude tilting of the tape rolls relative to the main walls. In order to achieve this it is important to minimize the friction between the tape edges and the foils. In the area near the reel hubs the foils have a comparatively high elasticity and at this location they can readily be urged towards the main walls. As a result of this elasticity, the reel hubs can also readily move in an axial direction, so that it is not unlikely that the reel hubs are also tilted to a certain extent relative to the main walls.

These movements may give rise to a slightly tilted position of the tape rolls in spite of the supporting action of the foils. Such tape roll tilting during tape transport may result in an irregular movement of the tape inside the housing. In practice, this may lead to problems if during the tape transport inside the housing the tape edges move at irregular distances from the main walls, and cause azimuth errors. These errors result from the magnetic tape being positioned in such a way at the location of the magnetic head that the longitudinal axis of the tape no longer extends perpendicularly to a plane through the air gap of the magnetic head. Such azimuth errors lead to a deterioration in higher-frequency reproduction and are therefore undesirable.

It is to be noted that German Offenlegungsschrift No. 2,327,828, to which U.S. Pat. No. 3,923,272 corresponds, describes a magnetic-tape cassette in which the foil is tensioned to some extent near centering rims on the main walls, by providing an axially projecting inner ring on the reel hub. In this known cassette the thickness of the two main walls is slightly reduced near the centering rims, so that at this location some clearance exists to allow axial movements of the reel hub. Since the thickness of the other parts of each main wall is comparatively large, the axial clearance for the tape roll is comparatively small. This is liable to give rise to jamming of the tape roll. Further, this known magnetic-tape cassette does not have a supporting ring which provides a corrective action.

SUMMARY OF THE INVENTION

It is the object of the invention to construct a nagnetic-tape cassette of the type defined in the opening paragraph in such a way that the reel hubs occupy a position of optimum centering inside the cassette housing.

In a casette according to the invention, each reel hub comprises an inner ring and an outer ring, the inner ring having a greater axial length than the outer ring. The liner foil is positioned against the axial ends of both the inner ring and the outer ring, the inner side of each main wall being provided with a flat supporting ring which is concentric with the centering rim. Each supporting ring has a diameter which is larger than the outer diameter of the reel hub, the distance between two opposite supporting rings, viewed perpendicularly to the main walls, being larger than the sum of the width of the magnetic tape and the thicknesses of the two liner foils.

Owing to the comparatively large axial dimension of the inner ring of the reel hub relative to the dimension of the outer ring, each foil is flexed slightly towards the main wall in the area around the centering rim and is thus tensioned. As a result of this tensioning, the foil will act as a spring in the rim area, so that the two foils together tend to keep the reel hub centered relative to a plane of symmetry of the housing, which plane is situated equidistantly from the main walls. If in spite of this tensioning action the reel hub with the tape roll is slightly moved and/or tilted in an axial direction as a result of forces which occur, the center portion of the foil is pressed against the supporting ring on the inner side of the main wall. The spring action of the foil on the reel hub now causes such a reactive force on the reel hub that this reel hub is moved back slightly. Thus, the reel hub and the tape roll on this hub are centered continually. This centering causes azimuth errors occurring during the tape transport inside the cassette housing being suppressed continually. Further, there is practically always some clearance, larger than the foil thickness, between the axial sides of the tape roll and the inner sides of the main walls, so that the tape edge cannot bind in the event of an axial displacement. This is important, because during take-up of the magnetic tape on the reel hub an axial displacement of the respective tape roll may occur which should be restrained primarily by the elastic exerted by the liner foils. Even if the foil cannot adequately restrain the axial displacement of the tape rolls, the clearance reduces the likelihood of binding of the tape roll.

A preferred embodiment of the invention is characterized in that the distance between two facing supporting rings is larger than the sum of the axial dimensions of the outer ring and the thickness of the two liner foils. This step ensures that, despite the presence of the supporting rings, there is always some clearance between the axial sides of the tape roll and the main wall to allow movements of the tape roll towards the main walls during winding. This further reduces the risk of jamming of the tape roll.

Further, the distance between two facing supporting rings is preferably at least substantially equal to the sum of the axial dimension of the inner ring and the thicknesses of the two liner foils. This dimensioning ensures that the resilient action of the foil in the central area is maintained in the case of an axial displacement of the tape roll.

In the magnetic-tape cassette of the type known from German Offenlegungsschrift No. 2,121,375, the liner foil is elongate with mutually parallel longitudinal sides and supporting edges adjacent these sides. These edges are inclined relative to a main part of the foil towards the inner side of the main wall, the longitudinal sides bearing elastically against the main wall. Preferably, the outer diameter of each supporting ring is smaller than the distance between the longitudinal sides of the adjacent liner foil. In this way the diameter of the supporting ring is in conformity with the width of the sliding foil and the supporting ring cannot disturb the tape-edge guiding-action of the liner foil.

According to another aspect of the invention the supporting edges are interrupted at the location where the liner foil adjoins the supporting ring, and the foil is substantially flat over its entire width at this location. The flat shape ensures that the foil engages correctly against the supporting ring.

The invention also relates to a winding device for use in combination with such a magnetic-tape cassette. The winding device comprises at least one winding spindle with which a reel hub of the cassette is coupled so that it can be driven to take up the magnetic tape. The reel hub comprises radially directed spokes on the outer ring, projections on the circumference of the winding spindle engaging these spokes. In such a winding device, positioning elements position the housing of the cassette. A supporting ring is provided near the projections, the ring being connected to and concentric with the winding spindle. These projections are inclined relative to the axis of rotation of the winding spindle in such a way that when the reel hub is driven the projections exert an axially directed force on the reel hub to urge the reel hub against the supporting ring. The positioning elements are arranged in such a way relative to the supporting ring that a plane of symmetry of the reel hub extends perpendicularly to the axis of rotation. This hub symmetry at least substantially coincides with the plane of symmetry which is spaced equidistantly from the respective main walls of the cassette housing.

By thus positioning the reel hub on the supporting ring, the reel hub occupies an accurately defined position relative to the plane of symmetry of the cassette housing. These steps improve the lace-up of the magnetic tape inside the cassette housing, resulting in a further reduction of azimuth errors. The positioning of the reel hubs further precludes burning of the foils as a result of the friction occurring during fast winding of the magnetic tape. Therefore, this combination is particularly suitable for semi-professional and professional uses. An example of such a use is an apparatus for rapidly loading a length of magnetic tape into a cassette housing. Such apparatus winds the magnetic tape with a very high speed.

Embodiments of the invention will be described in more detail, by way of example, with reference to the accompanying drawings.

DESCRIPTION OF THE PREFERRED EMBODIMENT

Figure 1:
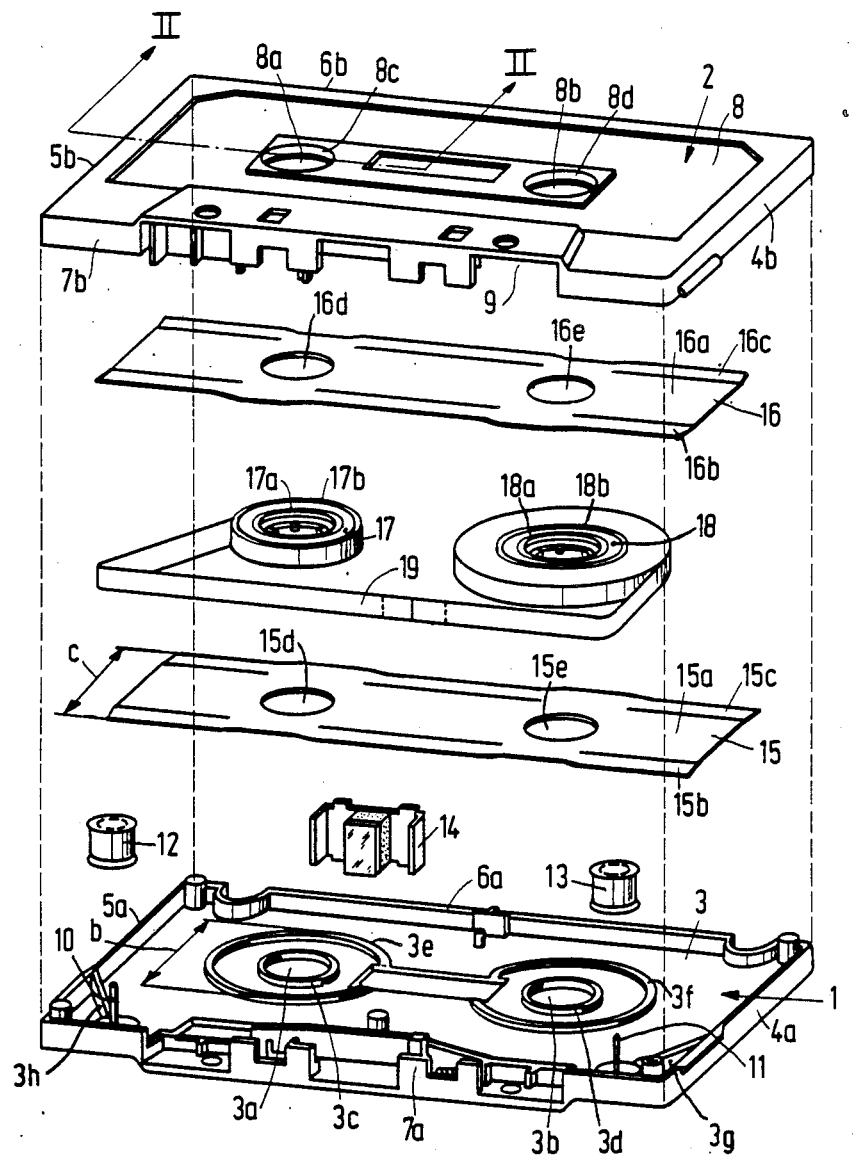
FIG. 1 is an exploded view of a magnetic-tape cassette in accordance with the invention.

The magnetic-tape cassette shown in FIG. 1 comprises a housing having two housing sections 1 and 2. The housing section 1 comprises a rectangulr main wall 3a, two short side walls 4a and 5a, and two long side walls 6a and 7a, the side wall 6a forming part of a rear wall and the side wall 7a forming part of a front wall of the housing. Similarly, the housing section 2 comprises a rectangular main wall 8 which extends parallel to the main wall 3, short side walls 4b, 5b and long side walls 6b, 7b. In the assembled condition the short walls 4a and 4b, 5a and 5b and the long side walls 6a, 6b and 7a, 7b adjoin each other to form a housing which is closed, apart from a number of openings 9 in the wall 7. Two pins 10 and 11 are arranged near the two front corners of the housing and extend substantially perpendicularly to the main wall 3. These pins serve as spindles for guide rollers 12 and 13 respectively. Further, a shielding member 14 carrying a felt pressure element is arranged near a central opening 9 in the front wall 7.

Each main wall 3, 8 is formed with two openings 3a, 3b and 8a, 8b respectively. Inwardly extending cylindrical centering rims 3c, 3d and 8c, 8d respectively are formed on the inner side of each main wall.

A liner foil, 15 and 16 respectively, is arranged against the inner side of each main wall 3, 8. These foils are elongate with mutually parallel longitudinal sides and, adjoining these sides, supporting edges 15b, 15c and 16b, 16c respectively which are inclined relative to main portions 15a and 16a respectively towards the inner sides of the adjoining main walls 3 and 8 respectively. The foils are formed with two circular holes 15d, 15e and 16d, 16e respectively. The supporting edges 15b, 15c and 16b, 16c are interrupted near the holes 15d, 15e and 16d, 16e, respectively, so that the foils 15 and 16 respectively are substantially flat at this location.

Figure 2:
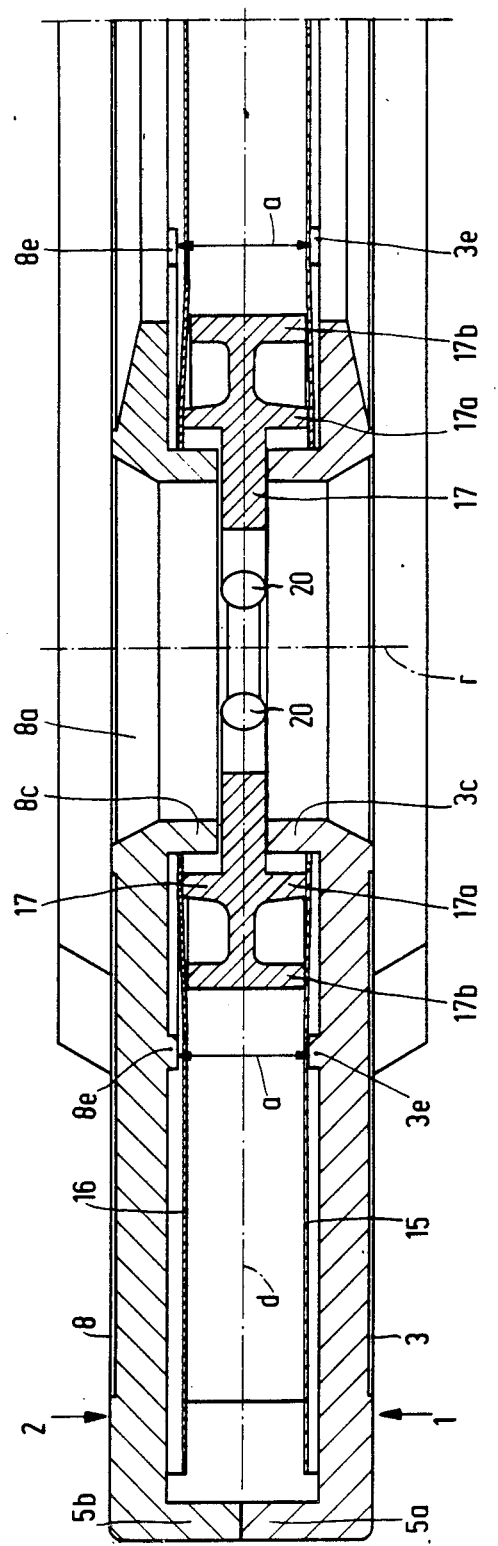
FIG. 2 shows the cassette in an enlarged-scale sectional view taken on the lines II—II in FIG. 1.

The centering rims 3c, 3d and 8c, 8d formed on the main walls engage these holes (see also FIG. 2). As a result of the inclined supporting edges 15b, 15c and 16b, 16c the main portions 15a and 16a respectively are situated at some distance from the inner sides of the main walls 3 and 8 respectively, as is shown in FIG. 2. The reel hubs 16 and 18 are axially supported between these main portions. Because of the elasticity of the foils 15 and 16, these reel hubs are axially movable and are rotatable about axes of rotation r which extend substantially perpendicularly to the main walls 3, 8. The reel hubs 17 and 18 hold a length an of magnetic tape 19, each reel hub 17 or 18 containing a tape roll whose diameter depends on the situation during tape transport from one reel hub to the other.

Each reel hub has an inner ring, 17a and 18a respectively, and an outer ring, 17b and 18b, respectively. As is shown in FIG. 2 for the reel hub 17, the axial length of the inner ring 17a is larger than that of the outer ring 17b. The liner foils 15 and 16 bear against the axial ends of the two reel hubs, so that the foils are slightly bent towards the main walls 3, 8 in the area around the centering rims 3c, 3d and 8c, 8d respectively, thereby slightly tensioning the foils. Thus, at the location of the reel hubs the liner foils exhibit a spring action. The inner side of each main wall, which is flat apart from the ridges 3g, 3h, carries facing supporting rings 3e, 3f and 8e, 8f which are concentric with the respective centring rims (the supporting ring 8f is not shown but is situated on the main wall 8 opposite the supporting ring 3f).

The inner diameter of the supporting rings 3e, 3f, 8e, 8f is slightly larger than the outer diameter of the outer ring 17b, 18b. Further, it is important that the distance a between the facing supporting rings on the main walls 3 and 8 is larger than the sum of the width of the magnetic tape 19 and the thicknesses of the two liner foils 15, 16. This ensures that the magnetic-tape roll can move freely over one distance towards one main wall or the other without giving rise to jamming. Further it is important that the distance a is larger than the sum of the axial dimension of the outer ring 17b or 18b and the thickness of the two liner foils 15, 16. This also ensures that the clearance between the supporting rings is adequate to allow a slight displacement of the magnetic tape in an axial direction. Further, the distance a is at least substantially equal to the sum of the axial dimension of the inner ring 17a or 18a and the thicknesses of the two sliding foils. This is important because this enables the supporting rings to exert an adequate spring action on the reel hubs in the case of an axial displacement of the tape rolls. The outer diameter of each supporting ring, designated b in FIG. 1, is smaller than the distance c between the longitudinal sides of the respective liner foils 15 and 16. Thus, the diameter of the supporting ring is in conformity with the width of the liner foil, so that during operation the supporting ring cannot disturb the tape-edge guidance provided by the foil.

In order to facilitate cooperation with the tape roll the edges of each supporting ring 3c, 3f, 8e and 8f are bevelled at the location of a window in the main wall 3, 8.

Each winding hub 17 and 18 is provided with inwardly extending radial spokes 20 on the inner ring. These spokes are coupled with a winding spindle of a magnetic-tape apparatus during operation of the magnetic-tape cassette. Thus the magnetic-tape apparatus can drive the relevant reel hub to take up the magnetic tape 19.

As stated in the foregoing, the foils 15 and 16 act on each reel hub 17, 18 in such a way that the spring action of the foil tends to keep the reel hub substantially centered relative to a plane of symmetry d which is equidistantly spaced from the two main walls 3 and 8. In this respect it is to be noted that as a result of the weight of the tape roll the roll and the associated reel hub may be shifted slightly towards the lower main wall (the main wall 3 in FIG. 2) in the operating position. This displacement is limited in that the liner foil (the foil 15 in FIG. 2) is urged against the supporting ring with the locally flat portion. If, for example as a result of shocks or other causes, the reel hub and the tape roll on this hub are tilted the center portion of the relevant foil causes a reactive force to be exerted on the reel hub. In this way the reel hub and the tape roll on this hub are constantly centred to an optimum extent inside the cassette housing, ensuring that during tape transport inside the cassette housing the tape remains centered to an optimum extent in order to preclude azimuth errors. Further, this centering results in some clearance between the liner foil and the inner side of the main wall on each side of the tape roll in the direction of the main wall 3 or 8. This clearance ensures that the tape does not bind inside the cassette housing.

Figure 3:
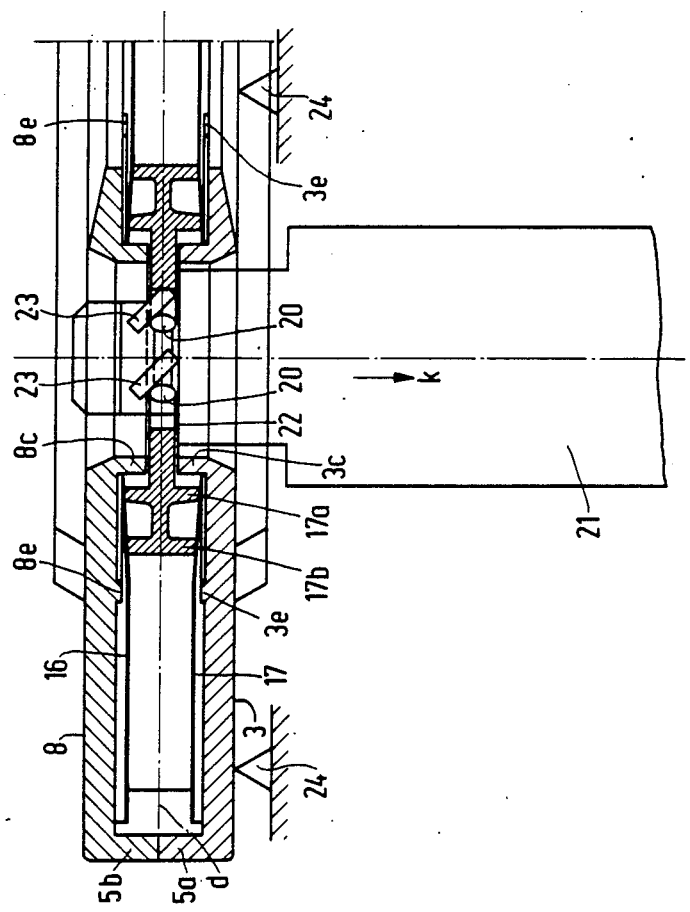
FIG. 3 is a sectional view similar to that in FIG. 2 but on a slightly reduced scale, also showing parts of a winding device.

As shown in FIG. 3, the magnetic-tape cassette in accordance with the invention can be used advantageously in combination with a winding device having at least one winding spindle 21 which carries a supporting ring 22, which is concentric with the spindle and serves as a supporting surface for the inner portion of the reel hub 17 or 18. Directly above the supporting ring 22 the winding spindle has a plurality of projections 23 which are inclined in such a way that during rotation of the winding spindle 21 an axially directed force k is exerted on the reel hub to urge the reel hub against the supporting ring 22. During take-up of the magnetic tape this arrangement ensures that the reel hub is constantly urged firmly against the supporting ring 22.

Further, the winding device comprises a plurality of positioning elements, which are schematically represented by the reference numeral 24 in FIG. 3, for positioning the cassette housing, the position of the positioning elements 24 relative to the supporting ring 22 being accurately defined in such a way that the reel hubs 17 and 18 are centered accurately relative to the plane of symmetry d. When the magnetic tape is taken up this accurate positioning of the reel hubs inside the cassette housing also ensures an optimum winding of the tape roll on the reel hubs. The tape rolls are then substantially spaced equidistantly from the main walls 3 and 8 in an optimum manner, so that the friction between the tape rolls and the liner foils 15, 16 is minimal. In particular during fast winding this spacing may preclude burning of the liner foils. This is particularly important in semiprofessional and professional uses, for example in apparatuses for rapidly loading a length of magnetic tape into a cassette housing. It is to be noted, however, that alternatively the winding device shown may form part of a magnetic-tape apparatus, which has the advantage that the magnetic tape is positioned accurately inside the housing to further reduce the aforementioned azimuth errors.

We claim:
1. A magnetic tape cassette comprising:
- a housing having two parallel main walls having respective inner sides facing each other, and means for interconnecting said main walls to hold them in fixed relationship with respect to each other, each main wall having two openings bounded by circular cylindrical centering rims extending inwardly relative to the respective main wall, said openings and rims in one main wall being coaxial with respective openings and rims formed in the other main wall,
- two reel hub sets disposed between said main walls, each reel hub having two respective axial ends and a given outer diameter, and being arranged to be rotatable about a respective axis of rotation extending substantially perpendicularly to the main walls and subdstantially coaxially with respect to a respective pair of said coaxially aligned openings,
- a length of magnetic tape having a given width, wound in a number of turns around and extending between said reel hubs, and
- two liner foils, each having a given thickness and being positioned against a respective inner side of a respective main wall, each said foil being arranged to bear elastically against said turns of magnetic tape and against the respective axial ends of said reel hubs,
- characterized in that each reel hub comprises a respective axially extending outer ring having a given length, and a respective axially extending inner ring having an axial length greater than said given length, said rings having respective axial ends arranged such that said liner foils are posi- tioned and bear against said respective axial ends of both said inner rings and said outer rings, and the inner side of each main wall comprises two inwardly extending flat supporting rings, each supporting ring being concentric with a respective centering rim and having an inner diameter larger than said outer diameter of the respective reel hub; respective supporting rings on each of said main walls being opposite each other and spaced a distance, perpendicularly to said main walls, larger than the sum of said given width and said thicknesses of said two liner foils.

2. A cassette as claimed in claim 1, characterized in that said distance between two opposite supporting rings is larger than the sum of said given length of the outer ring and the thicknesses of the two liner foils.

3. A cassette as claimed in claim 2, characterized in that said distance between said opposite rings is at least substantially equal to the sum of said axial length of said inner ring and the thicknesses of the two liner foils.

4. A cassette as claimed in claim 3, in which each liner foil is elongate and has mutually parallel longitudinal sides and, adjacent said sides, respective supporting edges inclined relative to a main part of the foil towards the inner side of the respective main wall, said respective longitudinal sides bearing elastically against said respective main wall, characterized in that each supporting ring has an outer diameter smaller than a distance between the longitudinal sides of the respective adjacent liner foil.

5. A cassette as claimed in claim 4, characterized in that, at a location where a liner foil joins a supporting ring, said foil is substantially flat over its entire width, and said supporting edges are interrupted.

6. A cassette as claimed in claim 1, in which each liner foil is elongate and has mutually parallel longitudinal sides and, adjacent said sides, respective supporting edges inclined relative to a main part of the foil towards the inner side of the respective main wall, said respective longitudinal sides bearing elastically against said respective main wall, characterized in that each supporting ring has an outer diameter smaller than a distance between the longitudinal sides of the respective adjacent liner foil.

7. A cassette as claimed in claim 6, characterized in that, at a location where a liner foil joins a supporting ring, said foil is substantially flat over its entire width, and said supporting edges are interrupted.

8. The combination of a winding device, and a cassette comprising a housing having two parallel main walls having respective inner sides facing each other, and means for interconnecting said main walls to hold them in fixed relationship with respect to each other, each main wall having two openings bounded by circular cylindrical centering rims extending inwardly relative to the respective main wall, said openings and rims in one main wall being coaxial with respective openings and rims formed in the other main wall, two reel hub sets disposed between said main walls, each reel hub having two respective axial ends and a given outer diameter, and being arranged to be rotatable about a respective axis of rotation extending substantially perpendicularly to the main walls and substantially coaxially with respect to a respective pair of said coaxially aligned openings, a length of magnetic tape having a given width, wound in a number of turns around and extending between said reel hubs, and two liner foils, each having a given thickness and being positioned against a respective inner side of a respective main wall, each said foil being arranged to bear elastically against said turns of magnetic tape and against the respective axial ends of said reel hubs, the cassette being characterized in that each reel hub comprises radially directed spokes for driving engagement by a spindle, and a respective axially extending outer ring having a given length, and a respective axially extending inner ring having an axial length greater than said given length, said rings having respective axial ends arranged such that said liner foils are positioned and bear against said respective axial ends of both said inner rings and said outer rings, and the inner side of each main wall comprises two inwardly extending flat supporting rings, each supporting ring being concentric with a respective centering rim and having an inner diameter larger than said outer diameter of the respective reel hub; respective supporting rings on each of said main walls being opposite each other and spaced a distance, perpendicularly to said main walls, larger than the sum of said given width and said thicknesses of said two liner foils, said device comprising at least one winding spindle arranged for coupling to one of said reel hubs when said cassette is coupled to said device, for driving said one hub to take up magnetic tape onto said hub, said spindle having a circumference having projections extending therefrom arranged for engaging said spokes of said reel hub of said cassette, into which the spindle is inserted, characterized in that said device comprises a plurality of positioning elements arranged for positioning said housing, said spindle includes a hub supporting ring disposed near said projections, said projections are inclined relative to the axis of rotation of the winding spindle such that, when the reel hub is driven by the spindle, said projections exert an axially directed force on the reel hub to urge the driven reel hub against the supporting ring, and said positioning elements are arranged relative to said hub supporting ring such that a plane of symmetry of the reel hub, extending perpendicularly to the axis of rotation of the hub, at least substantially coincides with a plane of symmetry spaced equidistantly from the respective main walls of the housing.

* * * * *